United States Patent [19]

Wilson et al.

[11] Patent Number: 4,642,217
[45] Date of Patent: Feb. 10, 1987

[54] FUEL ROD FOR A NUCLEAR REACTOR HAVING AN IMPROVED END PLUG ASSEMBLY

[75] Inventors: John F. Wilson, Murrysville Boro; Robert K. Gjertsen, Monroeville; Samuel Cerni, Churchill Boro, all of Pa.

[73] Assignee: Westinghouse Electric Corp., Pittsburgh, Pa.

[21] Appl. No.: 634,728

[22] Filed: Jul. 26, 1984

[51] Int. Cl.[4] ............................................. G21C 3/10
[52] U.S. Cl. ................................... 376/451; 376/418
[58] Field of Search ............. 376/451, 452, 456, 412, 376/413, 418, 420, 426, 429, 430

[56] References Cited

U.S. PATENT DOCUMENTS

| 3,100,742 | 8/1963 | McGeary et al. | 376/420 |
|---|---|---|---|
| 3,153,280 | 10/1964 | Jones et al. | 376/451 |
| 3,180,804 | 4/1965 | Flora et al. | 376/451 |
| 3,184,392 | 5/1965 | Blake | 376/451 |
| 3,225,437 | 12/1965 | Stohr et al. | 376/451 |
| 3,406,094 | 10/1968 | Beisswenger et al. | 376/451 |
| 3,466,226 | 9/1969 | Lass | 376/420 |
| 3,560,339 | 2/1971 | McHugh | 376/420 |
| 3,625,823 | 12/1971 | Kerr et al. | 376/451 |
| 3,627,635 | 12/1971 | Smith et al. | 376/451 |
| 3,647,623 | 3/1972 | Hepps et al. | 376/451 |
| 3,679,545 | 7/1972 | Leirvik | 376/451 |
| 3,804,710 | 4/1974 | Bresnick | 376/451 |
| 3,816,248 | 6/1974 | Cayol et al. | 376/451 |
| 3,892,626 | 7/1975 | Hirose | 376/451 |
| 3,996,100 | 12/1976 | Oguma et al. | 376/456 |
| 4,046,631 | 9/1977 | Clapham | 376/451 |
| 4,111,748 | 9/1978 | Hayashi et al. | 376/451 |
| 4,257,847 | 3/1981 | Gibby et al. | 376/420 |
| 4,273,616 | 6/1981 | Andrews | 376/420 |

FOREIGN PATENT DOCUMENTS

| 1514958 | 7/1969 | Fed. Rep. of Germany | 376/412 |
|---|---|---|---|
| 18508 | 8/1968 | Japan | 376/412 |
| 1596072 | 8/1981 | United Kingdom | 376/413 |

Primary Examiner—Charles T. Jordan
Assistant Examiner—Richard Klein

[57] ABSTRACT

A nuclear reactor fuel rod includes a fuel tube and an improved end plug assembly having a pair of hollow end plugs which seal opposite ends of the fuel tube. Each end plug has an outer body portion with an outside diameter substantially the same as the outside diameter of the fuel tube and an inner body portion of reduced diameter inserted into an end of the tube. Each plug has a cavity defined therein which increases the space within the rod for fission gas expansion. An outer region of the cavity within the outer body portion of the end plug is undercut relative to an inner region of the cavity within the inner body portion of the plug. One of the end plugs also has an insert fitted into its inner body portion which prevents fuel chips from falling into the cavity of the end plug. A slot is formed axially in a side wall of the insert which allows communication of gas from the tube into the cavity of the end plug.

9 Claims, 4 Drawing Figures

FUEL ROD FOR A NUCLEAR REACTOR HAVING AN IMPROVED END PLUG ASSEMBLY

BACKGROUND OF THE INVENTION

1. Field of the Invention

The present invention relates generally to fuel assemblies for nuclear reactors and, more particularly, is directed to a nuclear fuel rod having an improved end plug assembly which provides a cavity for additional fission gas space, reduces stress concentration in the fuel rod end and establishes a barrier to fuel chip entry into the cavity.

2. Description of the Prior Art

As well known in the art, a fuel rod for use in fuel assemblies of a nuclear reactor includes a plurality of cylindrical nuclear fuel pellets, such as composed of $UO_2$ enriched with U-235, disposed end to end within a tubular cladding member or fuel tube. The fuel tube is an elongated thin-walled tube, preferably of a zirconium alloy. The opposite ends of the fuel tube are closed by upper and lower end plugs, preferably formed of the same material as the fuel tube.

It is well known that the overall efficiency of a nuclear reactor can be increased and the useful life of its fuel rods prolonged if the fuel rods are internally pressurized. Thus, during fabrication of a fuel rod an inert gas, such as helium, is introduced into the fuel tube under pressure after which the end plugs are welded in the tube ends to seal the tube. Additional internal pressure within the tube arises during operation of the nuclear reactor wherein gasses are generated over the life of the fuel rod. Toward the end of the fuel rod's life, its internal pressure can reach as high as 1000 psi.

During operation of the reactor the higher pressure of the coolant (approximately 2500 psi) on the exterior of the fuel rods normally offsets the internal pressure of the fuel rods. However, during shut down of the reactor, the external pressure of the coolant decreases to zero. Then, the internal pressure of the fuel rod causes outward expansion of the tube. In one prior art fuel rod having a solid end plug inserted into the fuel tube end and welded thereto at the juncture of the tube end and the plug periphery, outward expansion of the tube results in the location of a stress riser and the concentration of the point of maximum discontinuity stress at the weld joint. As long as the tube material and stresses are within the fatigue life limits, the weld joint will not fail. However, if the weld is imperfect or the material loses ductility due to hydriding and/or irradiation hardening, the weld joint may fail.

One solution is to form a cavity within the end plug to provide extra space for fission gas buildup and to form the weld joint between the fuel tube end and a thin section machined into the end plug. An end plug designed along these lines is disclosed and illustrated in U.S. Pat. No. 3,679,545 to Leirvik. This design embodies advantages from a stress standpoint as well as a welding standpoint. From the stress standpoint, additional space provided by the cavity in the end plug reduces the pressure of gas buildup and thereby relieves expansion of the fuel tube, to some degree, during reactor shut down. Also, although this design has the same discontinuity stress, the stress riser due to the end plug-to-fuel tube junction does not occur at the point of maximum discontinuity stress, since the latter is located farther outwardly along the end plug within the cavity. Therefore, the maximum discontinuity stress is not increased by a stress concentration factor as was the case in the solid end plug design. From the welding standpoint, parts of approximately equal thicknesses are easier to weld together than parts which have a large difference in their respective thicknesses.

However, some of the advantages of the design are offset by the replacement of some of the fuel pellets by ceramic pellets to thermally insulate the end plugs from the fuel pellets. This takes up valuable fuel pellet space in the fuel tube. Also, the design fails to make provision to prevent fuel pellet chips from falling into the end plug cavity at the lower end of the vertically-positioned fuel rod. Chips in the end plug cavity causes an additional problem of how to remove the heat generated by the chips in the end plug.

Consequently, a need exists to improve the design of end plugs used in fuel rods so as to add space to accommodate fission gas buildup without increasing fuel rod length or removing fuel pellets. In such improved design it is desirable to retain and enhance the positive features of prior art plug designs without at the same time assuming the burdens of their negative features.

SUMMARY OF THE INVENTION

The present invention provides a fuel rod with an improved end plug assembly designed to satisfy the aforementioned needs. As in the prior art end plug design, the present invention provides a cavity in each end plug of the assembly which increases available space for fission gases and locates the point of maximum discontinuity stress well away from the weld joint of the end plug to the tube of the fuel rod. However, in contrast to the prior art design, the end plug cavity of the invention is advantageously undercut to maximize fission gas space and has a smooth contour in the region of maximum discontinuity stresses which distributes them over a broader area. Further, the reduced wall thickness of the end plug at the region of the undercut cavity provides a certain amount of flexibility in the end plug which alleviates concentration of high stress at the weld joint. Additionally, the assembly of the invention includes an insert configured to fit within the cavity of the lower one of the end plugs for preventing fuel chips from falling therein while at the same time allowing communication of fission gas with the cavity.

Accordingly, the present invention is directed to a nuclear reactor fuel rod including a tubular cladding member or fuel tube, nuclear fuel and gas under pressure disposed within the tube, and an end plug assembly which seals opposite ends of the tube so as to confine the fuel and pressurized gas within the tube. The end plug assembly includes a pair of hollow end plugs. Each end plug has an outer body portion with an outside diameter substantially the same as the outside diameter of the fuel tube and an inner body portion of reduced diameter inserted into an end of the tube. Further, each end plug has a cavity defined therein which increases the space for fission gas expansion. An outer region of the cavity within the outer body portion of the end plug is undercut relative to an inner region of the cavity within the inner body portion of the end plug.

The end plug assembly also includes an insert associated with the lower one of the pair of end plugs. In its preferred form, the insert has a cylindrical side wall open at its outer end and an end wall which connects with and closes the inner end of the insert side wall disposed adjacent the fuel pellets in the fuel tube. The insert fits into the inner region of the cavity within the inner body portion of the end plug with the open outer end of its side wall resting on an internal ledge formed within the end plug adjacent the circumferential region of merger of the inner body portion with the outer body portion.

The insert side wall has a slightly larger outside diameter than the inside diameter of the inner body portion and, additionally, the side wall has a slot which splits the side wall in the axial direction. In view of this construction, with the insert placed in the end plug a radial spring force is created which holds the insert in place during handling of the end plug assembly and loading of it into the fuel rod. The distance from the ledge to the inner edge of the inner body portion is less than the length of the slot in the insert side wall, or for that manner the height of the side wall. Thus, an inner marginal edge portion of the insert side wall extends beyond the inner edge of the inner body portion, exposing the inner end of the slot to the interior of the fuel tube. This creates a gap through which fission gas can readily communicate with the cavity in the end plug. The gas can also find its way into the cavity through the annular contact fit between the external surface of the insert side wall and the internal surface of the end plug inner body portion. An alternative insert is adapted to be pressed into the inner body portion of the end plug and has a small diameter central opening which allows communication of fission gases with the cavity of the end plug.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
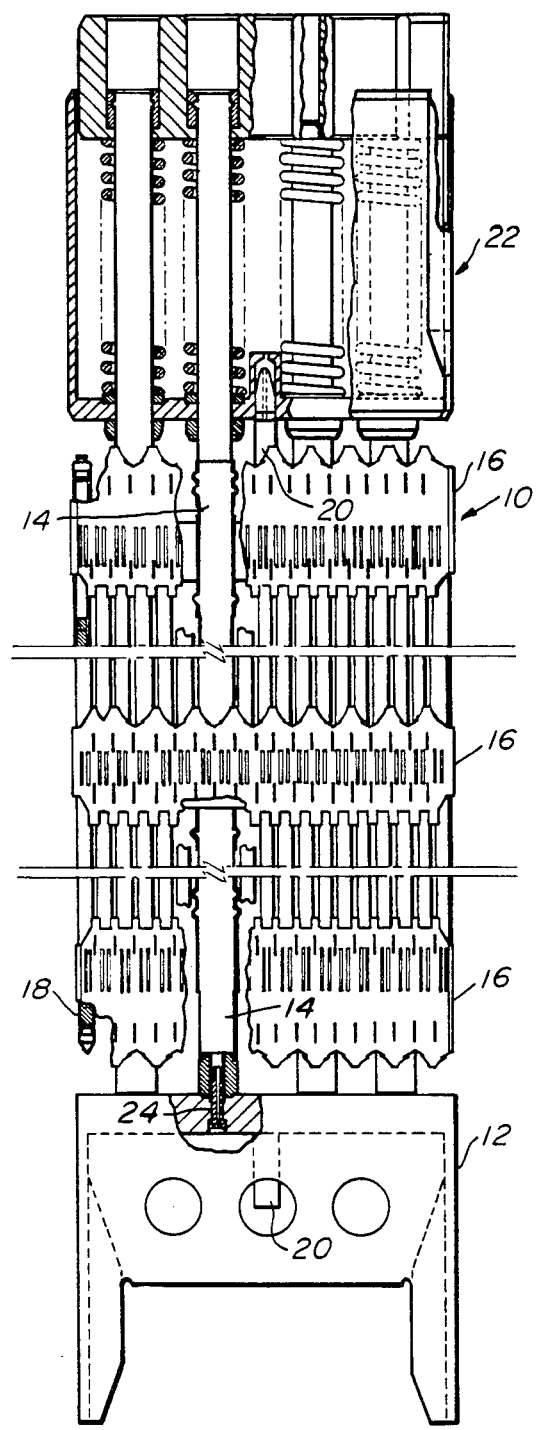
FIG. 1 is a partially sectioned elevational view, with parts being broken away for clarity, of a conventional fuel assembly having a fuel rod with an improved end plug assembly formed in accordance with the principles of the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

IN GENERAL

Referring now to the drawings, and particularly to FIG. 1, there is shown a partially sectioned elevational view, with parts broken away for clarity, of a fuel assembly constructed in accordance with well known practices, indicated generally by the numeral 10, which incorporates a preferred embodiment of the invention.

The fuel assembly 10 basically includes a lower end structure or bottom nozzle 12 for supporting the assembly on the lower core plate (not shown) in the core region of a reactor (not shown); an organized array of longitudinally extending control rod guide tubes or thimbles 14 projecting upwardly from the bottom nozzle 12; a plurality of transverse grids 16 axially spaced along the guide thimbles 14; and a plurality of elongated fuel rods 18 (only one of which being shown for clarity) transversely spaced and axially supported by the grids 16. It should be pointed out here that, in this embodiment, the lower ends of the elongated fuel rods 18 are shown being axially held and spaced above the bottom nozzle 12; however, they may be restably supported on the upper surface of the bottom nozzle 12. An instrumentation tube 20 is located at the center of the fuel assembly 10. Attached to the upper ends of the guide thimbles 14 is an end structure or top nozzle with holddown means incorporated therewithin, generally designated by the numeral 22, to form an integral assembly capable of being conventinally handled without damaging the assembly components.

To form the fuel assembly 10, the transverse grids 16 are attached to the longitudinally extending guide thimbles 14 at predetermined axially spaced locations; the fuel rods 18 are inserted from below through the grids 16, the lower nozzle 12 is then suitably attached, such as by machine screws 24, to the lower ends of the guide thimbles; and then the top nozzle subassembly 22 is attached to the upper end portions of the guide thimbles 14. To control the fission process, a plurality of control rods (not shown) are reciprocally movable in the control rod guide thimbles 14 of the fuel assembly 10.

Before describing a representative one of the fuel rods 18 in detail, it should be noted that the fuel assembly 10 depicted in FIG. 1 is of the type having a square array (19×19) of fuel rods 18 with sixteen control rod guide thimbles 14 strategically arranged within the fuel rod array. Further, the bottom nozzle 12 and likewise the top nozzle subassembly 22 are generally square in cross-section. In that the specific fuel assembly represented in FIG. 1 is for illustrational purposes only, it is to be understood that neither the shape of the nozzles, or the number and/or arrangement configuration of the fuel rods and guide thimbles are to be limiting, and that the invention is equally applicable to different shapes and arrangement configurations than the ones shown.

IMPROVED END PLUG ASSEMBLY OF NUCLEAR FUEL ROD

Figure 2:
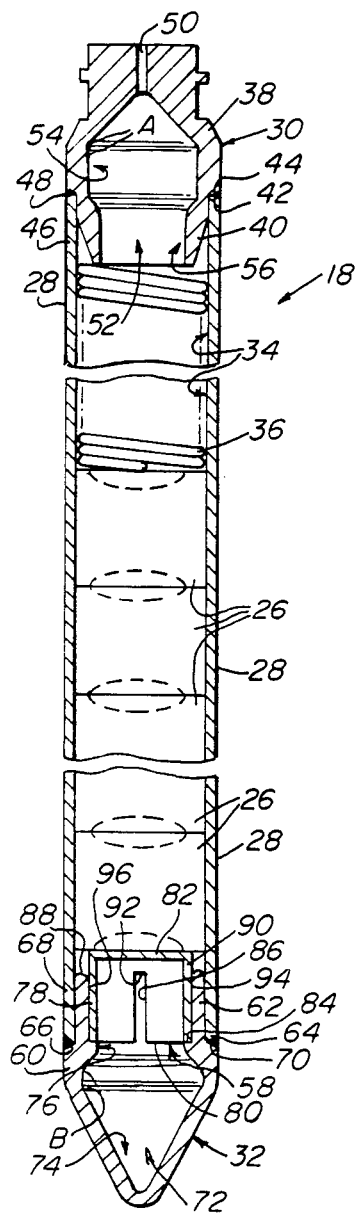
FIG. 2 is an enlarged, fragmentary sectional view of one of the fuel rods removed from the assembly shown in FIG. 1, illustrating the undercut configuration of the cavity in each of the end plugs of the assembly and the preferred embodiment of the insert disposed in one of the end plugs.

As best seen in FIG. 2, the nuclear fuel rod 18 includes a plurality of cylindrical nuclear fuel pellets 26, such as $UO_2$ enriched with U-235, disposed end to end within a tubular cladding member or fuel tube 28. The fuel tube 28 is an elongated thin-walled tube, preferably of a zirconium alloy. The opposite ends of the fuel tube 28 are closed by a pair of upper and lower end plugs 30,32 of the end plug assembly which incorporates the improved features of the present invention to be described shortly. The end plugs 30,32 are preferably formed of the same material as the fuel tube and seal the nuclear fuel as well as an inert gas under pressure within the fuel tube 28. A plenum chamber 34 is provided within the fuel tube 28, between one end of the axial stack of fuel pellets 26 and the adjacent end plug, such as upper end plug 30. A helical spring 36 is disposed within the plenum chamber 34, between the pellets 26 and the upper end plug 30. The spring 36 functions to hold the pellets 26 compactly in place against the lower end plug 32.

The upper end plug 30 of the improved end plug assembly basically comprises an outer body portion 38 with its maximum outside diameter substantially the same as the outer diameter of the fuel tube 28 to which plug 30 is attached and an inner body portion 40 with an outer diameter slightly less than the inner diameter of the tube 28. About the circumferential region of the plug 30 where the outer and inner body portions 38,40 merge together, there is defined an external annular shoulder 42 against which the upper edge 44 of the fuel tube 28 abuts when the upper end plug 30 is press fitted within the upper end portion 46 of the fuel tube. A girth weld 48 rigidly attaches and seals the upper end portion 46 of the tube 28 to the upper end plug 30 at the shoulder 42. Also, an axial bore 50 extends through the outer body portion 38. In a pressurized weld chamber, an inert gas is injected into the fuel tube 28, via axial bore 50, and then the outer end of the bore is sealed by welding.

Further, the upper end plug 30 is hollow having a first cavity 52 defined therein which increases the space for fission gas expansion from the plenum chamber 34. The outer region 54 of the first cavity 52 within the outer body portion 38 is undercut relative to inner region 56 of the cavity within the inner body portion 40 so as to maximize the fission gas space in the end plug 30 and to locate the region A of maximum discontinuity stress outwardly from the stress riser created at the weld 48 upon reduced expansion of the fuel tube 28 during reactor shut down. Also, the internal contour of the upper end plug 30 defining the first cavity 52 contains smooth transitions in the region of maximum discontinuity stresses, allowing a broader distribution of the stresses as opposed to concentration of them at one point. Additionally, the reduced wall thickness of the end plug 30 at the outer region 54 of the undercut cavity 52 provides a certain amount of flexibility in the end plug which alleviates concentration of high stress at the weld 48.

The improved end plug assembly also includes the lower end plug 32 and an insert 58. The lower end plug 32 basically comprises an outer body portion 60 having a generally vee-shaped cross sectional configuration and an inner body portion 62 of reduced diameter relative to the maximum diameter of the outer body portion 60 and having a generally cylindrical shape. The outer diameter of the inner body portion 62 is slightly less thant the inside diameter of the fuel tube 28 such that the lower edge 64 of the tube abuts against an inwardly-facing external annular shoulder 66 formed about the circumference of the lower end plug 32 at.the region of merger between the outer and inner body portions 62,64 when the lower end plug 32 is press fitted into the lower end portion 68 of the tube 28. A girth weld 70 rigidly attaches and seals the end plug 32 at the shoulder 66 to the lower end portion 68 of the fuel tube 28.

Similar to the upper end plug 30, the lower end plug 32 is hollow having a second cavity 72 defined therein which likewise increases the space for expansion of fission gas generated by the pellets 26. The outer region 74 of the second cavity 72 within the outer body portion 60 is undercut relative to the inner region 76 of the cavity 72 within the inner body portion 62 so as to maximize the fission gas space in the lower end plug 32 and to locate the region B of maximum discontinuity stresses outwardly from the stress riser created at the weld 70 due to expansion of the fuel tube 28 during reactor shut down. Also, the internal contour of the lower end plug 32 defining the second cavity 72 contains smooth transitions in the region of the maximum discontinuity stresses, allowing a broader distribution of the stresses as opposed to concentration of them at one point. Additionally, the reduced wall thickness of the end plug 32 at the outer region 74 of the second undercut cavity 72 provides a certain amount of flexibility in the lower end plug 32 which alleviates concentration of high stress at the weld 70.

The insert 58 is associated with the lower end plug 32 for preventing fuel chips from falling under the influence of gravity from the fuel tube 28 into the second cavity 72 of the lower end plug. As will be explained below, although the insert has means at one end to prevent entry of the fuel chips, it does have means which allows communication of fission gas in the fuel tube with the cavity in the end plug.

Figure 3:
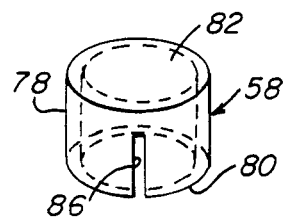
FIG. 3 is an enlarged perspective view of the insert of FIG. 2.

In its preferred form shown in FIGS. 2 and 3, the insert 58 has a cylindrical side wall 78 which is open at its lower or outer end 80 and an end wall 82 which connects with and closes the upper or inner end of the insert side wall. The insert end wall 82 is disposed adjacent to the fuel pellets 26 contained within the fuel tube 28. The insert 58 fits into the inner region 76 of the second cavity 72 within the inner body portion 62 of the lower end plug 32. When fitted therein as desired, the open outer end 80 of the insert's side wall 78 rests on an internal annular ledge 84 formed within the end plug 32 adjacent the circumferential region of merger of the inner body portion 62 with the outer body portion 60.

The insert side wall 78 has a slightly larger outside diameter than the inside diameter of the inner body portion 62 of the lower end plug 32. Also, the side wall 78 has a slot 86 which splits the side wall in an axial direction. In view of this construction, when the insert 58 is placed as desired in the end plug 32, a radial spring force is created which holds the insert 58 within the end plug 32 during loading of the same into the fuel tube 28.

The distance from the ledge 84 to the inner edge 88 of the end plug inner body portion 62 is less than the length of the slot 86 in the insert side wall 78 and the height of the side wall; thus, as seen in FIG. 2, an inner marginal edge portion 90 of the insert side wall 78 extends inwardly beyond the inner edge 88 of the inner body portion 62 and a corresponding inner end 92 of the slot 86 is exposed to the interior of the fuel tube 28. This creates a gap through which fission gas can expand into the cavity 72 in the lower end plug 32. Since the gas is under pressure, it can also pass into the cavity 72 between the external surface 94 of the insert side wall 86 and the internal surface 96 of the end plug inner body portion 62. The inner marginal edge portion 90 of the insert side wall 78 also maintains the adjacent fuel pellet 26 out of contact with the lower end plug 32 so as to minimize heat transfer thereto.

Figure 4:
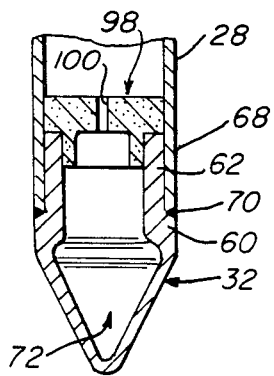
FIG. 4 is a fragmentary sectional view of the lower end of the fuel rod of FIG. 2, but showing an alternative version of the insert.

FIG. 4 depicts an alternate insert 98 adapted to be pressed into the inner region 76 of the second cavity 72 within the inner body portion 62 of the lower end plug 32. The insert 98 is preferably formed from zinc oxide material and has a small diameter central opening 100 which allows communication of fission gases from the fuel tube 28 to within the second cavity 72 while preventing passage of fuel chips therein.

Since both inserts 58 and 98 fit within the lower end plug 32, they act to minimize end plug length which, in turn, maximizes active fuel and plenum length within the fuel tube 28. Also, use of either insert to space the adjacent pellet out of contact with the end plug makes it necessary to use ceramic pellets to thermally insulate the end plug from the fuel pellets. Thus, replacement of a fuel pellet is avoided. The extra fission gas space added by the use of the end plug assembly of the present invention is approximately equivalent to the space occupied by one fuel pellet.

It is thought that the invention and many of its attendant advantages will be undetstood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a nuclear reactor fuel rod including a fuel tube and nuclear fuel and gas under pressure disposed within said tube, an improved end plug assembly which seals opposite ends of said tube so as to confine said fuel and pressurized gas within said tube, said assembly comprising:
   (a) a pair of end plugs attached in sealing relationship to said opposite ends of said tube;
   (b) at least one of said end plugs having an inner body portion fitted wtihin said end of said tube and an outer body portion extending outwardly from said tube; and
   (c) said one end plug having a cavity defined therein which communicates with said fuel tube, said cavity including an outer region within said outer body portion and an inner region within said inner body portion, said outer cavity region being undercut relative to said inner cavity region.

2. The improved end plug assembly as recited in claim 1, wherein said outer body portion has a maximum outside diameter substantially the same as the outside diameter of said fuel tube and said inner body portion has a diameter reduced relative to that of said outer body portion.

3. The improved end plug assembly as recited in claim 1, further comprising:
   (d) an insert fitted into said inner region of said cavity within said inner body portion of said one end plug, said insert allowing communication between said cavity and said fuel tube while preventing fuel from entering said cavity from said tube.

4. The improved end plug assembly as recited in claim 3, wherein said insert includes:
   a cylindrical portion fitted within said inner body portion and having means at its inner end extending into said fuel tube to prevent entry of fuel into said cavity; and
   means defining an opening between said cavity and said fuel tube for providing communication of gas from said tube to said cavity.

5. The improved end plug assembly as recited in claim 4, wherein said opening defining means is a central opening formed in said inner end of said cylindrical portion.

6. The improved end plug assembly as recited in claim 3, wherein said insert includes:
   a cylindrical side wall open at its outer end;
   an end wall connected to and closing said side wall at its inner end; and
   means defined on said side wall for providing communication of gas from said tube to said cavity.

7. The improved end plug assembly as recited in claim 6, wherein:
   said side wall has an inner marginal portion which extends into said fuel tube beyond said inner body portion of said end plug; and
   said means defined on said side wall is in the form of a slot which extends axially along said side wall and into said inner marginal portion thereof past said inner body portion.

8. The improved end plug assembly as recited in claim 6, wherein said side wall is fitted within said inner body portion, has an axial slot formed therein and is of an outside diameter slightly larger than the inside diameter of said inner body portion such that a radial spring force is created which holds said insert within said inner body portion of said end plug.

9. The improved end plug assembly as recited in claim 8, wherein said inner body portion has an internal annular ledge therein upon which said side wall of said insert rests.

* * * * *